United States Patent [19]

Trowbridge

[11] Patent Number: 5,451,240
[45] Date of Patent: Sep. 19, 1995

[54] COMPOSITIONS FOR STIMULATING PLANT GROWTH; THEIR PREPARATION AND USAGE

[76] Inventor: Robert Trowbridge, 144 Wisconsin Dr., Decatur, Ill. 62526

[21] Appl. No.: 793,832

[22] Filed: Nov. 19, 1991

[51] Int. Cl.⁶ .............................................. C05F 11/02
[52] U.S. Cl. ............................................ 71/24; 71/903
[58] Field of Search ................... 71/1, 23, 24, 25, 903

[56] References Cited

U.S. PATENT DOCUMENTS

| | | | |
|---|---|---|---|
| 124,041 | 2/1872 | Dotch | 71/24 |
| 2,992,093 | 7/1961 | Burdick | 71/24 |
| 3,111,404 | 11/1963 | Karcher et al. | 71/24 |
| 3,418,100 | 12/1968 | Cooley | 71/24 |
| 3,770,411 | 11/1973 | Chambers | 71/24 |
| 4,274,860 | 6/1981 | Firth, Jr. | 71/24 |
| 4,321,076 | 3/1982 | Firth, Jr. | 71/24 |
| 4,469,503 | 9/1984 | Stockel | 71/24 |
| 4,566,896 | 1/1986 | Firth, Jr. | 71/24 |
| 4,698,090 | 10/1987 | Marihart | 71/24 |
| 4,906,276 | 3/1990 | Hughes | 71/77 |
| 4,985,060 | 1/1991 | Higa | 71/6 |
| 4,985,061 | 1/1991 | Hughes | 71/68 |

FOREIGN PATENT DOCUMENTS

1039077  9/1978  Canada .................................... 71/24

OTHER PUBLICATIONS

Cervelli et al, Heavy Metal Hydrol. Cyek, CA 111(21):193638f 1988, pp. 355–360 (Abstract only cited).
Burdick, E. M. *Commercial Huamtes For Agriculture And The Fertilizer Industry*, pp 1–2, printed by Crop-Chem, Inc. P.O. Box 1473, Decatur, IL 62525. No date.
Scott, David D., *Humates*, pp. 1–7, published by Natural Edge Environmental Products, Orlando, Florida. No Date.
Senn, T. L. and Kingman, A. R., *A Report of Humate Research 1974–1975*, pp. 1–5, published by the Horticulture Department of The South Carolina Agricultural Experiment Station, Clemson University, Clemson, South Carolina. No Month.
Shomaker, J. W. and Hiss, W. L., *Humate Mining In Northwestern New Mexico*, p. 1, published by New Mexico Geol. Soc. Guidebook, 25th Field Conf., Ghost Ranch (Central–Northern N.M.) 1974.

*Primary Examiner*—Ferris Lander
*Attorney, Agent, or Firm*—Steven P. Shurtz; Willian Brinks Hofer Gilson & Lione

[57] ABSTRACT

A process for the preparation of compositions for stimulating plant growth whereby coal ash is fused with a humic acid-bearing ore, and more particularly fusing fly ash with leonardite ore; compositions produced by such a process; and methods for use thereof for stimulating plant growth.

18 Claims, No Drawings

COMPOSITIONS FOR STIMULATING PLANT GROWTH; THEIR PREPARATION AND USAGE

BACKGROUND OF THE INVENTION

The present invention relates to plant growth stimulants containing coal ash and humic acid-bearing ores and more particularly to plant growth stimulants containing fly ash and leonardite ore, an ore composed mainly of the mixed salts of humic acids.

Generally, "humic substances" is used as a generic term for the organic acids derived from humus or the top layer of soil, containing organic decomposition products of vegetation and animal organisms in admixture with inorganic compounds, sands, minerals, metal hydroxide bases, etc. The chemical structure of humic acids has not been established, but they are believed to be large condensed ring, polymer-like molecules containing pendent carboxylic acid phenolic groups. Current research indicates that it is the humic acid found in humus which promotes the chelation of nutrients.

"Humic acids" is generally used as the collective name for the various acid radicals found in humic matter. Thus, depending on their solubilities, humic acids are usually classified as humic acid, fulvic acid and ulmic acid. The singular "humic acid" is used to refer to the acid radical found in humic matter which is soluble in alkali but insoluble in acid, methyl ethyl ketone and methyl alcohol. Fulvic acid, for example, is the acid radical found in humic matter which is soluble in alkali, acid, methyl ethyl ketone and methyl alcohol. Ulmic acid is thus the acid radical found in humic matter which is soluble in alkali and methyl ethyl ketone but insoluble in methyl alcohol. The derivatives of these acids may be dispersed in water where they will hold fertilizer salts in an exchangeable form for plants and act as buffers and chelating agents.

"Humates" are the salts of the various humic acids. Collectively, they posses extremely high ion-exchange capacities and it is this property that makes possible better retention and utilization of fertilizers by preventing excessive leaching away from the root zones and ultimately releasing the fertilizers to the growing plants as needed. Humates also reduce soil erosion by increasing the cohesive forces of the very fine soil particles. Humates or humic acids thus not only greatly improve the texture and tilth of soils but actually help to mobilize and release nutrients otherwise unavailable to plants.

Humic acids are known to posses many beneficial agricultural properties: they participate actively in the decomposition of organic matter, rocks and minerals, improve soil structure and change physical properties of soil, raise exchange capacity and buffering qualities, promote the chelation of many elements and make these available to plants, aid in correcting plant chlorosis, act as an organic catalyst, increase the permeability of plant membranes, improve growth of various groups of beneficial microorganisms, intensify enzyme systems of plants and grass, accelerate cell division and increase germination capacity of seeds, show greater root development and decrease stress deterioration, produce stronger and healthier plants, aid in resisting plant disease better, reduce toxic sodium and pull sodium from clay particles, break the calcium-iron-phosphate bond and activate their benefits to plants, improve growth and vigor, prolong fruit and flower bearing capacity and retain moisture and nutrients in root zone areas. Thus, practically all modern soil management practices for garden and crop production are designed to increase the content of humic acids in the soil. In addition, the fertilizer industry has long emphasized the importance of maintaining the humic content of soils to ensure good productivity since humic matter is continuously being formed in soils, and at the same time, is being continuously destroyed.

Humic acids, like organic compounds of an individual nature, promote the conversion of a number of elements into forms available to plants. Humates thus aid in supplying growing plants with food. However, they serve in much more important ways to make soils more productive and farming more profitable. One of their most significant properties is that they increase the water holding capacity of soils. Thus, soils that contain relatively large amounts of humate material resist droughts more effectively and produce better yields where rainfall or irrigation may be insufficient.

Leonardite ore, also known as humate ore, is a believed to be an oxidized form of lignite coal which is mainly composed of the mixed salts of humic acids. It is unique in that it comprises decomposed vegetable growth and animal waste. Leonardire ore is a well-known source of humic acid and a wide variety of humates. It has also long been known to be a source of organic material adapted for use as soil and foliar additives having application in the regulation of plant growth. Moreover, it contains significant amounts of humic acid fractions, such as humic, ulmic & fulvic acids, that are vital to plant life.

Coal ash is another valuable substance which provides for the proper growth of plants. It consists of the inorganic mineral constituents in the coal and some organic matter which is not wholly burned. The inorganic mineral constituents, whose residue is ash, make up from 3% to 30% of the coal. During combustion, this ash is distributed into two parts; bottom ash collected from the bottom of the boiler unit, also sometimes referred to as bed ash or boiler slag, and fly ash, most of which is collected by air pollution control equipment. Fly ash makes up from 10% to 85% of the coal ash residue and occurs as spherical particles, usually ranging in diameter from 0.5 to 100 microns. The bottom ash, composed primarily of coarser, heavier particles than the fly ash, ranges from gray to black in color and is generally angular with a porous surface. The distribution of ash between the bottom and fly ash fraction is a function of the boiler type, coal type and whether or not a wet or dry bottom furnace was used.

Coal ash contains many of the minor and micro nutrients needed for effective plant growth. There are fourteen mineral elements which are essential to the growth of some plant or plants; calcium, magnesium, potassium, iron, manganese, molybdenum, copper, boron, zinc, chlorine, sodium, cobalt, vanadium and silicone. While all are not required for all plants, all have been found to be essential to some. These mineral elements, in addition to phosphorous and sulfur, usually constitute what is known as the plant ash, or minerals remaining after the burning off of carbon, hydrogen, oxygen and nitrogen.

The chemical elements nitrogen, phosphorous and potassium are known as macro-nutrients, which are required in the greatest quantity. Sulfur, calcium and magnesium, called secondary elements, are also necessary to the health and growth of vegetation, but they are required in lesser quantities compared to the macro-nutrients. The other elements of agronomic importance, provided for plant ingestion in small (or trace) amounts, include boron, cobalt, copper, iron, manganese, molybdenum and zinc. These minor elements are called micro-nutrients.

If one compares the elements found in coal ash residues to the list of elements required for plant nutrition, one finds considerable overlap. Tables I and II show the variation in coal ash compositions with coal rank and the chemical characteristics of coal and coal ash.

TABLE I

VARIATION IN COAL ASH COMPOSITION WITH COAL RANK

| Chemical Constituent | Coal Rank, Percent | | | |
|---|---|---|---|---|
| | Anthracite | Bituminous | Subbituminous | Lignite |
| $SiO_2$ | 48–68 | 7–68 | 7–58 | 6–40 |
| $Al_2O_3$ | 25–44 | 4–39 | 4–35 | 4–26 |
| $Fe_2O_3$ | 2–10 | 2–44 | 3–19 | 1–34 |
| $TiO_2$ | 1.0–2.0 | 0.5–4 | 0.6–2 | 0.0–0.8 |
| CaO | 0.2–4 | 0.7–36 | 2.2–52 | 12.4–52 |
| MgO | 0.2–1 | 0.1–4 | 0.5–8 | 2.8–4 |
| $Na_2O$ | — | 0.2–4 | — | 0.2–28 |
| $K_2O$ | — | 0.2–4 | — | 0.1–1.3 |
| $SO_3$ | 0.1–1 | 0.1–32 | 3.0–16 | 8.3–32 |

TABLE II

TRACE ELEMENTS IN COAL AND COAL ASH FROM DEPOSITS AROUND THE WORLD

| Element | Coal (ppm) | Ash (ppm) |
|---|---|---|
| Antimony | 10–30 | 100–3,000 |
| Arsenic | 0.8–500 | 280–10,000 |
| Barium | 2–257 | 18–2,200 |
| Beryllium | <0.1–40 | 1–4,000 |
| Bismuth | 0–100 | 0–2,000 |
| Boron | 15–156 | 52–10,000 |
| Chlorine | 30–560 | |
| Chromium | <0.1–50 | <0.1–7,400 |
| Cobalt | <0.4–34 | <5–2,000 |
| Copper | 2.6–185 | 10–1,200 |
| Fluorine | 40–480 | |
| Gallium | <1.4–100 | 10–3,200 |
| Germanium | <0.4–50 | 9–47,000 |
| Iodine | 1.11 | |
| Lanthanum | <1.5–40 | <30–700 |
| Lead | 25–3,000 | 200–31,000 |
| Manganese | 9–>5,000 | 100–22,000 |
| Mercury | 0.001–300 | |
| Molybdenum | <0.7–200 | <5–6,000 |
| Nickel | 0.42–>60 | <5–16,000 |
| Palladium | | 0.2 |
| Platinum | | 0.7 |
| Rhodium | | 0.02 |
| Silver | 0–3 | 0–60 |
| Strontium | 0–100 | 0–>1,000 |
| Scandium | | 60–400 |
| Tin | <0.1–300 | 0.4–6,000 |
| Titanium | 95–2,320 | 100–35,000 |
| Uranium | 0–24,000 | 6–1,650 |
| Vanadium | <1.4–>100 | <10–25,000 |
| Yttrium | <0.1–49 | <10–2,000 |
| Zinc | 7.6–2,000 | 115–21,000 |
| Zirconium | 0–140 | 0–7,000 |

When comparing the elements of coal ash residues and the required elements for plant growth, it is found that only sufficient quantities of nitrogen, phosphorous and chlorine are not available in fly ash residues and perhaps sufficient potassium depending on the origin of the coal ash.

Coal ash has been used in fertilizer compositions, wherein the nutrients in the ash have been chemically modified. For example, U.S. Pat. No. 4,469,503; issued to R. F. Stockel, discloses a fertilizer composition which comprises coal ash and a relatively water-insoluble polymer capable of gradually decomposing to slowly release nitrogen. The polymer is formed by the in situ polymerization of an aldehyde and a polymerizable organic nitrogen.

Similarly, humic acid containing material such as peats, humates, lignites, leonardite and the like have been proposed heretofore for use as ingredients of plant fertilizer compositions, although it has previously been necessary to extract the humic acids from the ore prior to their use. For example, U.S. Pat. No. 4,698,090; issued to J. R. Marihart discloses a process for preparation of compositions for modifying plant growth, including extracting humic acids by the reaction of organic chelating agents with leonardite ore.

To achieve an effective fertilizer, it is necessary to transform some of the elements found in coal ash residue into desirable chemical moieties. The constituents of coal ash, however complete, must be in the form in which plants can use them. The mere presence of particular chemical elements in the soil is not enough. The problem of maintaining optimum growing conditions is to have the essential elements not only present, but in a form readily available to each plant's requirements. Although both coal ash and humate ores have previously been used individually for various agricultural purposes, there still exists a need for a convenient and complete plant growth stimulant, which can adequately provide and convert the required nutrients into the proper form.

SUMMARY OF THE INVENTION

In one aspect of the present invention, humic acid bearing ores are used as soil conditioners wherein the humic acids have been activated, such as through the use of potassium hydroxide. Unlike the prior art, the humic acids are activated in their ore form, without first having to extract them. In another aspect, an important feature of the present invention is the novel combination of coal ash and humate ore, and the complex therein formed between the humic acid and the calcium and sulfur in the coal ash. In another aspect of the invention, activated humic acid bearing ores are combined with coal ash to provide a composition with excellent plant growth stimulant abilities. In yet another aspect of the present invention, it has been found that when coal ash contains sulfur and calcium compounds in their complexed state, it can also be used as an effective plant growth stimulant.

In a still further aspect, the present invention comprises a novel method of preparation and usage of the various plant growth stimulant compositions.

It has been found that the humic acids contained in leonardite ore can be chemically activated in the ore itself, i.e. without first having to extract them. This activated leonardite ore is then combined with fly ash, an otherwise unusable by-product of coal consumption, which contains many of the minerals required for proper plant growth. By fusing a humate ore wherein the humic acids have been activated and coal ash, the humic acids are complexed with the calcium and sulfur compounds and other nutrients in the coal ash. Many of the elements necessary for proper plant growth become available for use by plant life. The resulting product is a plant growth stimulant which is capable of releasing significant amounts of humic acids, as well as micro- and macro-nutrients contained in the ash that are vital to plant growth.

The present invention thus provides a convenient and efficient method of preparing a more complete plant growth stimulant. This novel method results in a composition which has excellent plant growth stimulant abilities.

DESCRIPTION OF THE PREFERRED EMBODIMENTS

The present invention relates to plant growth stimulants comprising humic acid bearing ores and coal ash, and the methods of making and using such compositions. In a preferred embodiment of the present invention, the ash and the ore would be combined to form an effective and efficient plant growth stimulant. It has been found, however, that when the constituents of each have been complexed, they can also be used individually.

Humic acid-bearing ores in which the humic acid has been activated can be combined with coal ash to form a product which has excellent plant growth stimulant abilities. There are several known sources of humic acid, including peats, peat moss, humates, lignite and brown coal. These sources, however, contain insignificant amounts of humic acid and are thus not considered to be valuable sources of humic acid. Leonardite ore, which is an oxidized form of lignite coal, however, has generally been found to contain significant quantities of recoverable humic acid.

Leonardite ore, preferably having a high humic acid content such as that commonly mined in New Mexico is used in practicing the present invention. However, the humic acid in a given ore sample, and the origin of the ore sample, are not to be considered controlling for limiting the practice of the described processes. An important feature of the processes of the present invention resides in the discovery that the humic acids contained in leonardite ore can be activated in their ore form, without first having to extract such acids. In accordance with the present invention, leonardite ore, preferably crushed prior to use thereof, is admixed with a reagent, preferably potassium hydroxide, which then activates or complexes the humic acids contained in the leonardite ore, making them available for use as plant growth stimulants.

The leonardite ore should first be ground or crushed into an acceptable size. A high speed grinder is preferably used to crush the ore. The ore will then be in numerous forms, including dust, smaller particles and larger chunks. The ore should be in the form of small particles, preferably able to pass through a U.S. Standard 200 mesh screen.

Once the ore has been ground to the proper size, it is ready to be activated. It has been found that potassium hydroxide, potassium nitrate or aqueous ammonia will function to activate or complex the humic acids contained in the ore. As used herein, the term "complexed" means to make the nutrients more readily available for use by plants. In addition, as used herein, the term "activate" means to make the humic acids more readily releasable from the ore. Potassium hydroxide, however, is the preferred reagent for the activation process. A 37% solution of potassium hydroxide is preferably added to the leonardite ore in a 1:10 ratio. Thus, for every 1000 lbs. of leonardite ore, 100 lbs. of 37% (or 37 lbs. of) potassium hydroxide is used. Although 37 lbs. of potassium hydroxide per 1000 lbs. of ore is preferred, the ore can also be activated by the addition of 18 lbs. to 55 lbs. of potassium hydroxide per 1000 lbs. of ore. A paddle mixer may be used to combine the ore and the potassium hydroxide, wherein the potassium hydroxide is sprayed on the leonardite ore. Depending on the equipment used, the mixing process itself may take about 20-30 minutes. Solutions of either of the three reagents, or a combination of potassium hydroxide and aqueous ammonia, will also function to activate the humic acids. The ore, prior to the addition of the potassium hydroxide, generally has a moisture content of about 10%-15%. After the addition of the preferred reagent, potassium hydroxide, the ore will become moist. After thoroughly mixing, the composition should then be run through an air dryer to remove the excess moisture and return the ore to a moisture content of less than 15%.

The other valuable constituent of the present invention is coal ash. Although both types of ash (fly and bottom) will function, it is preferable to use fly ash. It is preferable to use coal ash which can pass through a U.S. Standard 100 mesh screen. Thus, fly ash is preferred since it is already in the proper particle size range. Bottom ash generally consists of larger particles and must be further ground. In addition, it is also preferable to use ash from coal which has a high sulfur content (preferably 3.5% sulfur in the coal). The hardness of the coal, i.e. whether it be bituminous, subbituminous, lignite or anthracite, is generally of no consequence. As you can see from the Table I, however, subbituminous and lignite coal generally have a significantly higher sulfur content than do the other forms.

In order to use the fly ash, it is preferable to first hydrate it. This hydration process, however, can also occur later in the process, i.e. when the coal ash and the activated leonardite ore are combined.

To hydrate the ash, water is sprayed onto the ash in a large mixer. The percentage of water to fly ash is generally less than 5%. That is, for every 100 lbs. of fly ash, no more than 5 lbs. of water is used. The optimum range is between 3% and 5% water. Excess water can make the ash into a slurry, which is not desirable since the ash must eventually dry out.

While the water is added, the mixture is stirred, generally for about 20-30 minutes. Hydrating the ash will generate significant amounts of heat, which is known as the heat of hydration. The starting temperature of the ash is generally at about 60°-70° C. During hydration, the temperature will then rise to about 150°-200° C. After the ash and the water have been thoroughly mixed, the mixture is transferred to a holding unit, where the heat is generated. The mixture is then allowed to cool down. The entire hydration process takes about 24 hours.

It is at this point where the activated leonardite ore and the hydrated fly ash are preferably combined, although it is possible to combine all the materials, including inactivated leonardite ore and unhydrated fly ash, at the same time. However, the heat of hydration then must be dissipated without allowing an excess temperature rise in the leonardite ore, which would negatively affect the proper formation of a prill. In addition, the humic acids from a composition prepared by this one-step process would be released more slowly than those prepared in the preferred two-step process. Preferably, the activated ore and the hydrated ash are combined in a 50:50 weight to weight ratio. It has been found, however, that mixtures containing 30% to 70% activated ore and 70% to 30% hydrated ash will also function well.

Although it is preferable to combine the activated ore and the hydrated ash, each can be prilled and used separately. The hydrated ash would have to be further complexed by the addition of at least one member of the group consisting of potassium hydroxide, potassium nitrate, aqueous ammonia and a humic acid solution. If the ash and the ore were to be prilled separately, a liquid binding agent would be necessary.

It is preferable, though not necessary, to bind the dry mixture of activated leonardite ore and hydrated fly ash into a form which is easily and conveniently handled. The preferred method is to prill the dry mixture by adding a suitable liquid binding agent. The size of the prill can vary within a commercially acceptable or industry standard, though generally measuring from 1/32 to ¼ inch.

In order to bind the dry mixture of activated ore and hydrated ash together, a liquid binding agent is typically used during the prilling process. Any liquid or solution which is capable of physically binding or fusing together these constituents is acceptable. The preferred binding agent, however, is a solution comprising potassium hydroxide and aqueous ammonia. This solution provides the benefit of further activating and complexing the nutrients in the fly ash and the humic acids. The solution will preferably contain 10–75 lbs. of potassium hydroxide per 1000 lbs. of ore, more preferably, 18–55 lbs. of potassium hydroxide per 1000 lbs. of ore, and most preferably approximately 37 lbs. of potassium hydroxide per 1000 lbs. of ore. Similarly, the solution will contain 10–60 lbs. of ammonia per 1000 lbs. of ore, more preferably, 15–45 lbs. of ammonia per 1000 lbs. of ore, and most preferably, approximately 30 lbs. of ammonia per 1000 lbs. of ore. Also appropriate, though not preferred, would be a solution of potassium nitrate.

It is believed that humic and fulvic acids contained in the ore are more readily released with potassium hydroxide. Similarly, fulvic acid is more readily released with aqueous ammonia. Thus, exposure of the ore-ash mixture to a solution containing both potassium hydroxide and aqueous ammonia complexes or activates these acids more thoroughly than either reagent alone. The humic acids in the leonardite ore, as well as the micro- and macro-nutrients contained in the ash are thus made available in a form which can be readily used by plants.

In addition to the above solutions, solutions of either potassium hydroxide or aqueous ammonia, as well as a solution of potassium nitrate will also function to complex the humic acid, as well as the other micro- and macro-nutrients contained therein. Although it is preferred that the ore and the ash are combined prior to prilling, it is not necessary. That is, the preferred activating solutions can also be used to complex the ore and the ash individually, wherein they can also be separately prilled.

A rotary drum priller may be used wherein the activated leonardite ore and the hydrated fly ash are fed into the drum, which then turns at a speed which is related to the desired size of the prill. While the ingredients are fed into the drum priller, they are sprayed with the liquid binding agent or agents.

Lignin may also be added in order to aid in prilling. Lignin may be added, up to 20 lbs. per 2000 lbs. of solids (i.e. hydrated ash and activated ore), just prior to prilling. Preferably, 4 to 6 lbs. of lignin per 2000 lbs. of solids, and more preferably 5 lbs. of lignin per 2000 lbs. of solids is added to the mixture of hydrated ash and activated ore in the prilling machine at the same time the preferred solution of potassium hydroxide and aqueous ammonia is added. Lignin, which is a dark brown sap-like material, can also be added as the sole binding agent, i.e. without the preferred solution of potassium hydroxide and ammonia, or any other solution.

The present invention can be used for numerous agricultural purposes. For example, sod farmers can apply the composition to the area to be seeded, incorporating it into the top three inch area prior to seeding at the rate of one pound per 1000 square feet of surface. The composition can also be applied to tees and greens of golf courses at the rate of five pounds per 1,000 square feet, to be repeated semi-annually. In areas where there is a high sodium content in the soil, the composition, which acts as a buffering agent, can be applied at the rate of 300 pounds per acre, to be repeated on a four month cycle. The humic acids from the activated ore will assist in buffering sodium and assist in leaching the sodium out through rainfall or irrigation.

Additional uses included landscape operations, where the composition is applied prior to laying sod at a rate of two pounds per 1,000 square feet, lawns and grass fields, where the composition is applied by itself or with other compounds from 30 to 60 pounds per square acre semi-annually and green houses and nurseries.

In order to disclose the processes of the present invention still more clearly, the following Examples are included. It is understood, however, that these examples are merely illustrative and that the present invention is not to be limited to the specific conditions or details set forth. In the following Examples, all parts are by weight, unless otherwise indicated.

EXAMPLE I 900 lbs. of fly ash and 900 lbs. of leonardite ore are introduced into a 5 ton mixer and mixed thoroughly. The dry mixture is then fed into a prilling machine where 200 lbs. of solution, comprising 160 lbs. of a 37% solution of potassium hydroxide, 40 lbs. of a 30% solution of aqueous ammonia, 20 lbs. of an aqueous suspension comprising 4.0 lbs. of lignin. Three prill sizes, ¼, ⅛ and 1/16 inch, or any commercially acceptable size can be made. This material slowly releases the humic acids and other nutrients, and generally lasts for a three to five month period.

EXAMPLE II 900 lbs. of leonardite ore, which has an extractable humic acid content as high as 90%, is crushed in a high speed grinder, until the particles are of the size which can pass through a U.S. Standard 200 mesh screen. The ore is then placed in a large (5 ton mixer) wherein 90 lbs. of a 37% potassium hydroxide solution is added. The mixture is stirred for about 30 minutes and then passed through an air dryer where the excess moisture is removed. The activated ore should be relatively dry at this point.

900 lbs. of fly ash is placed in a large mixer. The particle size of the ash is defined as that which can pass through a U.S. Standard 100 mesh screen. Approximately 45 lbs. of water is added to the ash. The mixture is then stirred for about 30 minutes, after which the mixture is then transferred to a holding unit wherein it is allowed to stand for 24 hours.

The activated leonardite ore and the hydrated fly ash are then combined in a large paddle mixer and mixed thoroughly. The dry mixture is then fed into a prilling machine where a solution comprising 90 lbs. of a 37% potassium hydroxide solution, 90 lbs. of a 30% aqueous ammonia solution and 20 lbs. of an aqueous suspension comprising 4 lbs. of lignin is sprayed on the ore-ash mixture. The humic acids and the nutrients are complexed again and become more readily available for plant use. Three sizes of prills are produced: ¼, ⅛ and 1/16 inch. The material produced by this process will generally release the humic acids and other nutrients more quickly than the composition of Example I, i.e. the composition of Example II will release its nutrients over a period of sixty days.

A composition having the following analysis is generally produced by this process, although the identical reproduction of this composition is unlikely.

| RAW MATERIAL/CARBON AND HUMIC ACID ANALYSIS | | | |
|---|---|---|---|
| PROXIMATE ANALYSIS | | ULTIMATE ANALYSIS | |
| % MOISTURE | 10.50 | % MOISTURE | 10.50 |
| % ASH | 46.46 | % CARBON | 21.11 |
| % VOLATILE | 12.35 | % HYDROGEN | 01.32 |
| % CARBON | 22.69 | % NITROGEN | 00.55 |
| % SULFUR | 01.56 | % SULFUR | 01.56 |
| | | % ASH | 46.46 |
| | | % OXYGEN | 10.50 |
| MOISTURE AND ASH FREE: FIXED CARBON: | | | 56.96% |
| DRY, MINERAL MATTER FREE: FIXED CARBON: | | | 73.71% |
| HUMIC ACIDS EXTRACTABLE FROM ORE: | | | 90+% |

| TYPICAL MINERAL ANALYSIS OF RAW MATERIAL | | | | | |
|---|---|---|---|---|---|
| $Na_2O$ | 00.13% | MgO | 00.61% | $Al_2O_3$ | 04.68% |
| $SiO_2$ | 39.60% | $P_2O_5$ | 08.05% | S | 01.89% |
| Cl | 00.07% | $K_2O$ | 01.44% | CaO | 00.86 |
| $TiO_2$ | 00.62% | MnO | 00.01% | $Fe_2O_3$ | 04.24% |
| BaO | 00.04% | | | | |
| V | 74 PPM | Cr | 107 PPM | Co | <10 PPM |
| Ni | 15 PPM | W | <10 PPM | Cu | 23 PPM |
| Zn | 15 PPM | As | <20 PPM | Sn | <50 PPM |
| Pb | 18 PPM | Mo | <10 PPM | Sr | 95 PPM |
| U | <10 PPM | Th | <10 PPM | Nb | 11 PPM |
| Zr | 133 PPM | Rb | 68 PPM | Y | 21 PPM |

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of preparing a composition for stimulating plant growth comprising the steps of:
   (a) mixing water and fly ash to hydrate the fly ash;
   (b) separately mixing at least one member of the group consisting of potassium hydroxide, potassium nitrate and aqueous ammonia with a humic acid bearing ore to activate the humic acids while in the ore;
   (c) combining the activated humic acid-bearing ore with the hydrated fly ash.

2. The method of claim 1 wherein the mixture is fed into a prilling machine in the presence of a liquid binding agent which is capable of causing the mixture to form a prill.

3. The process of claim 2 wherein the liquid binding agent further comprises at least one member of the group consisting of potassium hydroxide, potassium nitrate, aqueous ammonia and lignin.

4. The method of claim 1 wherein the fly ash is derived from high-sulfur-content coal.

5. The method of claim 1 wherein the fly ash is of a particle size that can pass through a U.S. Standard 100 mesh screen.

6. The method of claim 1 wherein the mixture of activated humic acid-bearing ore and the hydrated fly ash is sprayed with at least one member of the group consisting of potassium hydroxide, potassium nitrate and aqueous ammonia in order to further complex the humic acids with calcium and sulfur compounds and other nutrients contained in the fly ash.

7. The method of claim 6 wherein the mixture is prilled.

8. The method of claim 7 wherein lignin is added to the mixture to help bind the mixture together into a prill form.

9. A method of preparing a fertilizer comprising the steps of:
   (a) mixing water and fly ash to hydrate the fly ash;
   (b) separately adding potassium hydroxide to a humic acid-bearing ore in order to activate the humic acids while contained in the ore;
   (c) mixing the hydrated fly ash and the activated humic acid bearing ore;
   (d) spraying a mixture of potassium hydroxide and aqueous ammonia on the dry mix to initiate fusing of the mixture and to further activate the humic acids in the ore;
   (e) adding lignin to the mixture to help bind the mixture together; and
   (f) prilling the mixture.

10. The method of claim 9 wherein the humic acid-bearing ore is leonardite ore.

11. The method of claim 10 wherein the leonardite ore is activated by the addition of a 18 to 55 lbs of potassium hydroxide in an aqueous solution per 1000 lbs. of ore.

12. The method of claim 9 wherein the humic acid bearing ore is selected from a group consisting of peats, peat moss, lignite, leonardite, humates and brown coal.

13. The method of claim 9 wherein the hydrated fly ash constitutes 30% to 70% of the hydrated fly ash/activated ore mixture.

14. The method of claim 9 wherein said fly ash is derived from a high-sulfur-content coal.

15. A method of stimulating plant growth comprising the steps of:
   (a) mixing water and fly ash to hydrate the fly ash;
   (b) separately mixing at least one member of the group consisting of potassium hydroxide, potassium nitrate and aqueous ammonia with a humic acid bearing ore to activate the humic acids while in the ore;
   (c) combining the activated humic acid-bearing ore with the hydrated fly ash;
   (d) applying the fused composition to soil to stimulate the growth of plants in the soil.

16. The method of claim 15 wherein the mixture of activated humic acid-bearing ore and the hydrated fly ash is further combined with at least one member of the group consisting of potassium hydroxide, potassium nitrate and aqueous ammonia.

17. The method of claim 15 wherein the combined mixture is prilled.

18. The method of claim 17 wherein lignin is added to the combined mixture prior to prilling.

* * * * *